(12) United States Patent
Nakazawa et al.

(10) Patent No.: US 10,107,469 B2
(45) Date of Patent: Oct. 23, 2018

(54) VEHICULAR LAMP, VEHICULAR LAMP CONTROL SYSTEM, AND VEHICLE INCLUDING THE SAME

(71) Applicant: Koito Manufacturing Co., Ltd., Tokyo (JP)

(72) Inventors: Misako Nakazawa, Shizuoka (JP); Shinji Kagiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/460,762

(22) Filed: Mar. 16, 2017

(65) Prior Publication Data

US 2017/0276308 A1    Sep. 28, 2017

(30) Foreign Application Priority Data

Mar. 24, 2016  (JP) .................................. 2016-059876

(51) Int. Cl.
| | |
|---|---|
| *B60Q 1/14* | (2006.01) |
| *F21S 8/10* | (2006.01) |
| *B60Q 1/24* | (2006.01) |
| *H05B 33/08* | (2006.01) |
| *F21S 41/141* | (2018.01) |
| *F21S 41/25* | (2018.01) |
| *F21S 41/60* | (2018.01) |
| *F21Y 115/10* | (2016.01) |

(52) U.S. Cl.
CPC .......... *F21S 48/125* (2013.01); *B60Q 1/1423* (2013.01); *B60Q 1/24* (2013.01); *F21S 41/141* (2018.01); *F21S 41/25* (2018.01); *F21S 41/60* (2018.01); *H05B 33/0803* (2013.01); *H05B 33/0842* (2013.01); *F21Y 2115/10* (2016.08)

(58) Field of Classification Search
CPC .. F21S 48/115; F21S 48/1154; F21S 48/1216; F21S 48/1266; B60Q 1/1423
USPC ............................................. 362/507; 315/82
See application file for complete search history.

(56) References Cited

U.S. PATENT DOCUMENTS

| | | | |
|---|---|---|---|
| 9,494,288 B2* | 11/2016 | Kobayashi | ........... F21S 48/1195 |
| 2008/0013329 A1* | 1/2008 | Takeda | ...................... F21K 9/00 |
| | | | 362/459 |
| 2012/0051071 A1* | 3/2012 | Okubo | ................. F21S 48/1159 |
| | | | 362/465 |
| 2012/0224384 A1* | 9/2012 | Takahira | ................... F21K 9/56 |
| | | | 362/509 |
| 2013/0003403 A1* | 1/2013 | Takahira | .............. B60Q 1/0023 |
| | | | 362/538 |

(Continued)

FOREIGN PATENT DOCUMENTS

JP       2005-161977 A     6/2005

*Primary Examiner* — Tung X Le
(74) *Attorney, Agent, or Firm* — Abelman, Frayne & Schwab

(57) ABSTRACT

Disclosed is a vehicular lamp including: a plurality of light emitting elements for drawing a pattern on a road surface which is individually turned ON/OFF; and an optical system which transmits light emitted from the plurality of light emitting elements, the plurality of light emitting elements is disposed along a horizontal direction of a vehicle in parallel, and the optical system projects a light source image of each light emitting element on a road surface as a light distribution pattern which extends in the vertical direction more than in the horizontal direction of the vehicle.

13 Claims, 11 Drawing Sheets

(56) References Cited

U.S. PATENT DOCUMENTS

2015/0241009 A1\* 8/2015 Brendle ................. F21S 48/115
                                                        362/521
2017/0241607 A1\* 8/2017 Courcier .............. F21S 48/1154

\* cited by examiner

VEHICULAR LAMP, VEHICULAR LAMP CONTROL SYSTEM, AND VEHICLE INCLUDING THE SAME

CROSS-REFERENCE TO RELATED APPLICATIONS

This application is based on and claims priority from Japanese Patent Application No. 2016-059876, filed on Mar. 24, 2016, with the Japan Patent Office, the disclosure of which is incorporated herein in its entirety by reference.

TECHNICAL FIELD

The present disclosure relates to a vehicular lamp capable of irradiating a light distribution pattern for road surface drawing, a vehicular lamp control system, and a vehicle including the same.

BACKGROUND

Japanese Patent Laid-Open Publication No. 2005-161977 discloses a vehicular travel support device that includes a trajectory predicting unit that predicts an advancing trajectory of the own vehicle and a low speed moving body detecting unit that detects a low speed moving body such as, for example, a pedestrian, and draws a pattern on a road surface with a laser light emitted from a laser projector so as to form a predetermined irradiation shape (e.g., a stop line figure formed by a longitudinally elongated line) over a predetermined range around an intersection between the advancing trajectory of the own vehicle and the moving trajectory of the low speed moving body or the vicinity of the intersection.

SUMMARY

A device that draws a predetermined mark on a road surface using a laser light as disclosed in Japanese Patent Laid-Open Publication No. 2005-161977 requires a scanning device and the like, and as a result, the configuration of the device is complicated and the device is expensive.

An object of the present disclosure is to provide a vehicular lamp, a control system of a vehicular lamp, and a vehicle including the same which are capable of obtaining a vertically-long light distribution pattern for drawing a road surface along a longitudinal direction of a vehicle with a simple configuration.

According to an exemplary embodiment, a vehicular lamp includes: a plurality of light emitting elements for road surface drawing which are individually turned ON/OFF; and an optical system configured to transmit light emitted from the plurality of light emitting elements. The plurality of light emitting elements may be arranged in parallel along a horizontal direction of a vehicle, and the optical system may project a light source image of each of the light emitting elements on a road surface as a light distribution pattern that extends in a vertical direction of a vehicle more than in a horizontal direction of the vehicle.

According to this configuration, for example, by detecting an object such as a pedestrian and irradiating a vertically elongated light distribution pattern toward the detected object, it is possible to make a driver recognize the presence of the object, thereby improving a driving safety.

The optical system may include a projection lens and an additional lens, the projection lens may be configured with a lens that turns light from the plurality of light emitting elements into parallel light beams in which a width in the horizontal direction and a width in the vertical direction are substantially equal to each other, and the additional lens may be configured with a lens that diffuses light in the vertical direction more than in the horizontal direction.

The additional lens may be disposed opposite to the plurality of light emitting elements with the projection lens being interposed therebetween, and a plurality of steps, which diffuse light in the vertical direction more than in the horizontal direction, may be formed on at least one of an light entrance surface and a light emission surface of the additional lens.

According to this configuration, it is possible to obtain a vertically elongated light distribution pattern with a simple configuration by disposing an additional lens in which a predetermined step is formed, in addition to the projection lens used as an optical system of a vehicular lamp in the related art.

The additional lens may be a lenticular lens including cylindrical steps which are formed to be arranged in parallel along a vertical direction of the vehicular lamp as the plurality of steps.

A lenticular lens including cylindrical steps, which are formed to be arranged in parallel along the vertical direction, may be used as the additional lens.

The optical system may be configured with a projection lens, and a plurality of steps, which diffuses light from the plurality of light emitting elements in the vertical direction more than in the horizontal direction, may be formed on a light entrance surface of the projection lens.

The optical system may be configured with a projection lens, and a plurality of steps, which diffuses light from the plurality of light emitting elements in the vertical direction more than in the horizontal direction, may be formed on a light emission surface of the projection lens.

According to this configuration, it is possible to obtain a vertically elongated light distribution pattern with a simple configuration by forming predetermined steps on any one surface of a projection lens.

The optical system may be configured with a cylindrical lens, and the cylindrical lens may be disposed such that a focal line direction of the cylindrical lens is aligned with a direction orthogonal to the parallel direction of the plurality of light emitting elements.

According to this configuration, it is possible to obtain a vertically elongated light distribution pattern with a simple configuration by arranging the focal line direction of a cylindrical lens to be orthogonal to the parallel direction of the plurality of light emitting elements.

The cylindrical lens may be configured with a toric lens.

According to this configuration, it is possible to obtain uniform brightness even at the opposite ends of a vertically elongated light distribution pattern.

In a light source image of each light emitting element, an aspect ratio of a width in the vertical direction with respect to a width in the horizontal direction may be 0.5 or more and 1.5 or less, and in the light distribution pattern projected on the road surface, an aspect ratio of a width in a longitudinal direction of the vehicle with respect to a width in a horizontal direction may be 5 or more.

According to another exemplary embodiment of the present disclosure, a control system of a vehicular lamp may include the above-described vehicular lamp, and an ON/OFF control unit configured to control turning-ON/OFF of the plurality of light emitting elements. The ON/OFF control unit may turn on at least one of the plurality of light emitting elements according to a position of an object other than the vehicle.

According to this configuration, it is possible to perform road surface drawing in an appropriate direction by changing light emitting elements to be turned on according to the change of a relative position of an object such as a pedestrian.

The ON/OFF control unit may make a luminous intensity or a flashing speed of the plurality of light emitting elements variable.

According to this configuration, it is possible to notify a driver or a pedestrian of the level of the degree of collision risk by changing the luminous intensity or the flashing speed of the light emitting element according to, for example, the degree of collision risk of an object against the vehicle.

According to still another exemplary embodiment, a vehicle includes: the above-described vehicular lamp, and the above-described control system of a vehicular lamp.

According to this configuration, for example, a safety of a vehicle in which the above-described vehicular lamp is mounted may be increased.

According to the present disclosure, it is possible to provide a vehicular lamp, a control system of a vehicular lamp, and a vehicle including the same which are capable of obtaining a vertically-long light distribution pattern for drawing a pattern on a road surface along a longitudinal direction of a vehicle with a simple configuration.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The exemplary embodiments described in the detailed description, drawings, and claims are not meant to be limiting. Other exemplary embodiments may be utilized, and other changes may be made, without departing from the spirit or scope of the subject matter presented here.

Hereinafter, exemplary embodiments of the present disclosure will be described in detail with reference to the accompanying drawings.

First Exemplary Embodiment

Figure 1:
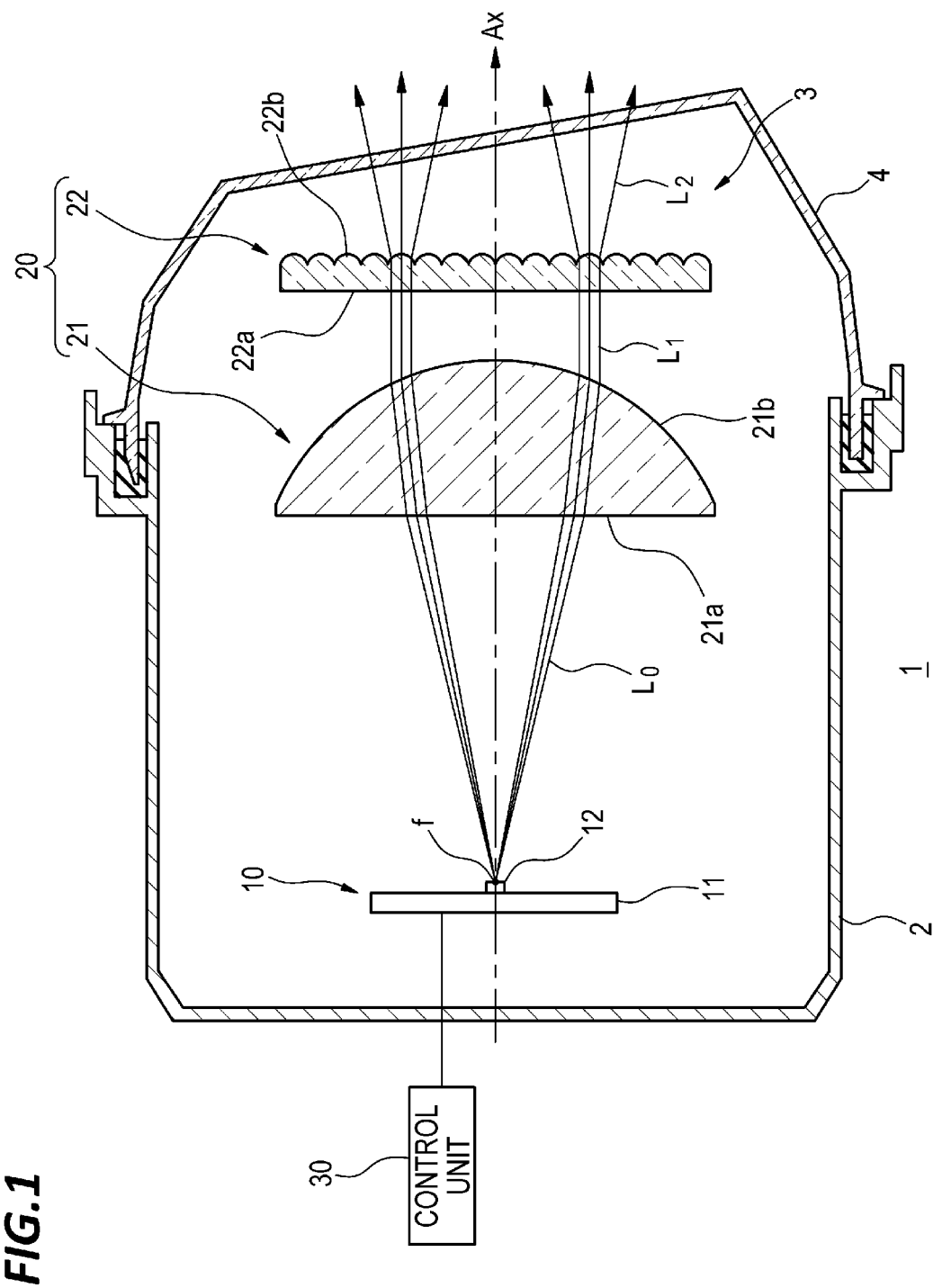
FIG. 1 is a vertical sectional view illustrating a schematic configuration of a vehicular lamp according to a first exemplary embodiment of the present disclosure.
Figure 2:
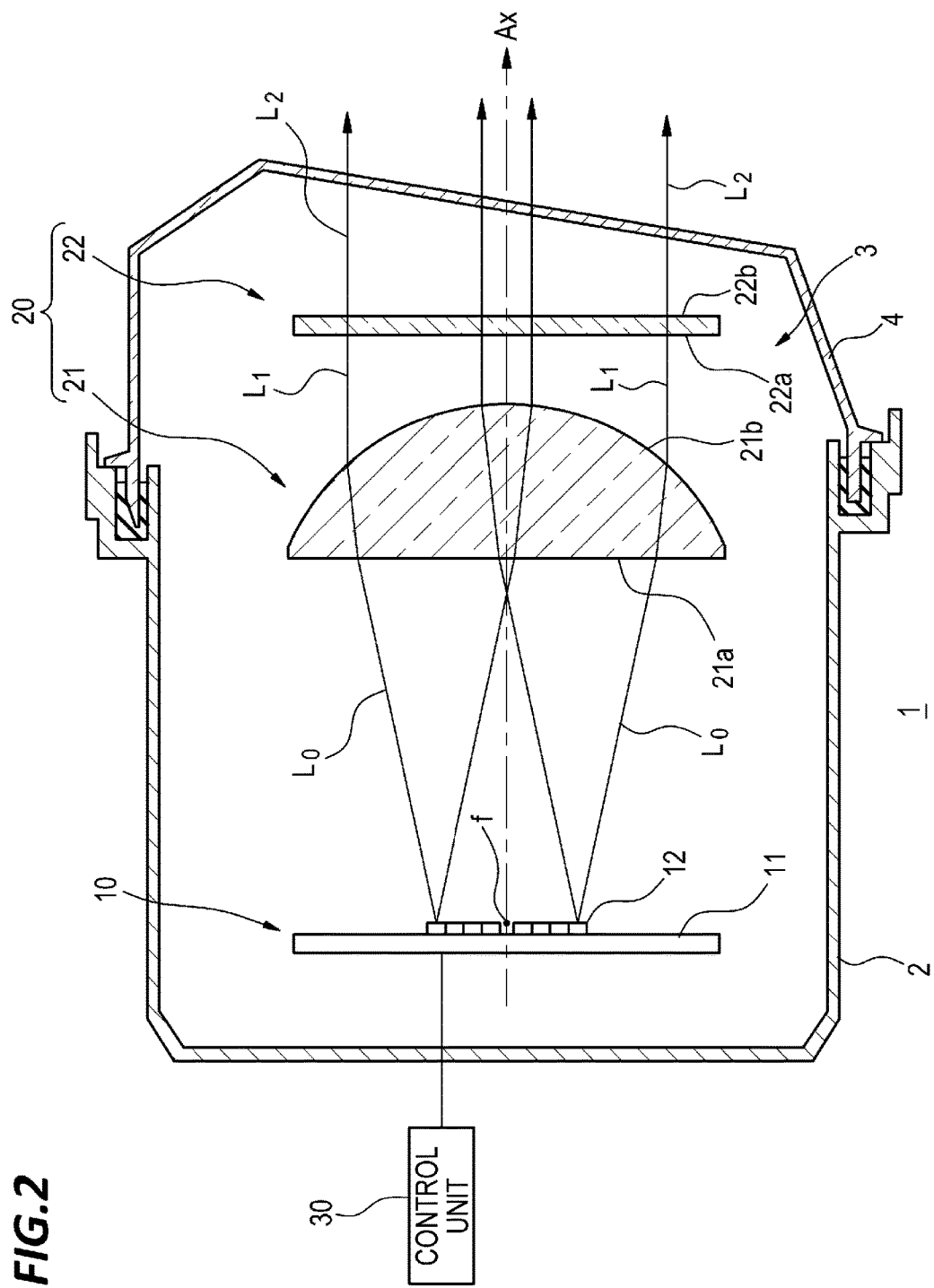
FIG. 2 is a horizontal sectional view illustrating a schematic configuration of the vehicular lamp illustrated in FIG. 1.

FIG. 1 is a vertical sectional view illustrating a schematic configuration of a vehicular lamp according to a first exemplary embodiment of the present disclosure, and FIG. 2 is a horizontal sectional view of the vehicular lamp illustrated in FIG. 1. A vehicular lamp 1 according to the present exemplary embodiment is a lamp unit for road surface drawing (a road surface drawing device) which is mounted on at least one of a pair of head lamps disposed at the left and right sides of the front of the vehicle. FIG. 1 illustrates a structure of a lamp unit for road surface drawing which is mounted in one of the head lamps as the vehicular lamp 1.

As illustrated in FIGS. 1 and 2, the vehicular lamp 1 includes a lamp body 2 having an opening at the front side of the vehicle and a translucent cover 4 attached to cover the opening of the lamp body 2. The translucent cover 4 is formed of a translucent resin or glass. Within a lamp chamber 3 formed by the lamp body 2 and the translucent cover 4, a light source 10 and a projection lens group 20 are accommodated. Each constituent element is attached to the lamp body 2 by a support mechanism (not illustrated).

Figure 3:
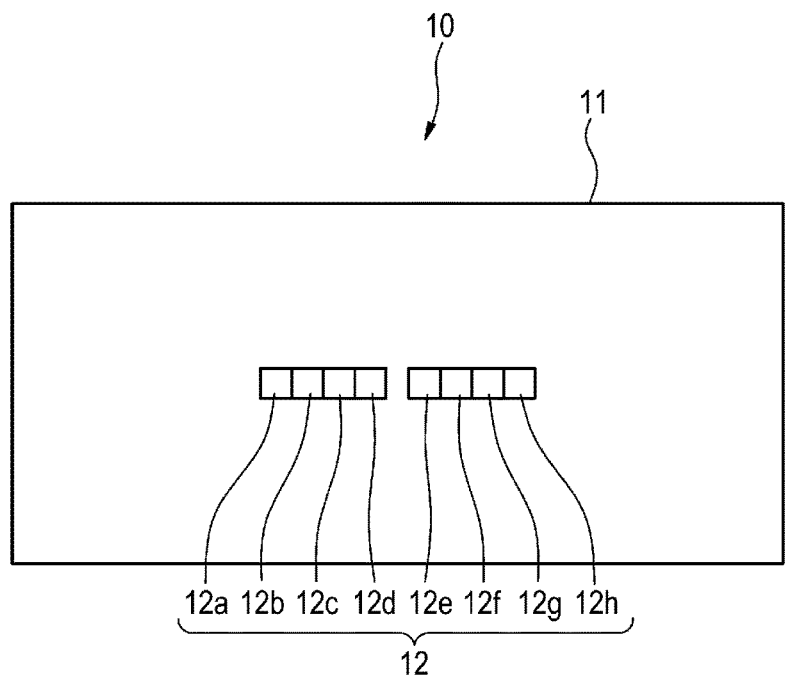
FIG. 3 is a front view of a light source according to the first exemplary embodiment when viewed from the projection lens side.

As illustrated in FIG. 3, the light source 10 includes a board 11 and a plurality of (eight in this exemplary embodiment) LED chips 12 (an example of light emitting elements). The plurality of light emitting elements 12 (12a to 12h) are arranged on the board 11 along a horizontal direction of the vehicular lamp. In the exemplary embodiment, for example, four LED chips 12a to 12d and four LED chips 12e to 12h are closely arranged in parallel to each other. The LED chips 12a to 12h may be individually turned ON/OFF in accordance with a control signal from the control unit 30. Each LED chip 23 has a substantially square light emitting surface, and may form a substantially square light source image. Further, each LED chip 23 may have a light emitting surface having a shape other than the square shape, for example, a rectangular shape. In each light source image formed by light from each LED chip 12, an aspect ratio of the width in the vertical direction in relation to the width in the horizontal direction may be, for example, 0.5 or larger and 1.5 or smaller when it is assumed that the width in the horizontal direction of the vehicle is 1. Further, a reflector having a curved reflective surface may be disposed in the vicinity of the light source 10 and light irradiated from the light source 10 toward the reflector may be reflected toward the projection lens group 20 by the reflector.

As illustrated in FIGS. 1 and 2, the projection lens group 20 (an example of an optical system) is disposed such that an optical axis Ax is directed to the front of the vehicular lamp and a rear focus f of the projection lens group 20 is located in the vicinity of the light emission surfaces of the LED chips 12. The optical axis Ax may be directed to a direction for irradiating light which transmits the projection lens group 20 onto a predetermined range of road surface in front of the vehicular lamp.

The projection lens group 20 is configured with a projection lens 21 (for example, a plane-convex lens) disposed close to the light source 10 and an additional lens 22 disposed closer to the projected image than the projection lens 21. The projection lens 21 includes a planar light entrance surface 21a and a convex emission surface 21b. The additional lens 22 includes a light entrance surface 22a and a light emission surface 22b. The light entrance surface 21a of the projection lens 21 faces the LED chips 12 and the light emission surface 21b of the projection lens 21 faces the light entrance surface 22a of the additional lens 22. Further, the light emission surface 22b of the additional lens 22 faces the front side of the vehicular lamp. A plurality of cylindrical steps are formed to be parallel to each other on the light emission surface 22b of the additional lens 22 in the vertical direction of the vehicular lamp and thus the additional lens 22 serves as a so called lenticular lens.

As illustrated in FIGS. 1 and 2, light beams $L_0$ emitted from each LED chip 12 are incident on the light entrance surface 21a of the projection lens 21 and is emitted from the light emission surface 21b. At this time, the light beams $L_0$ are refracted toward the optical axis Ax on the light entrance surface 21a and the light emission surface 21b of the projection lens 21, thereby becoming light beams $L_1$ that are parallel to the optical axis Ax. Subsequently, the parallel light beams $L_1$ are incident on the light entrance surface 22a of the additional lens 22 and are emitted from the light emission surface 22b on which a plurality of cylindrical steps are vertically arranged in parallel to each other. At this time, the light beams $L_2$ which transmit the additional lens 22 to be emitted to the outside are turn into light beams parallel to the optical axis Ax in a plane parallel to a horizontal plane including the optical axis Ax, as illustrated in FIG. 2. In the meantime, as illustrated in FIG. 1, in a plane parallel to a vertical plane including the axis Ax, the light beams $L_2$ are turned into vertically diffused light beams with respect to the optical axis Ax by the cylindrical steps formed on the light emission surface 22b. As described above, the additional lens 22 according to the exemplary embodiment may convert light, which has been converted into parallel light beams $L_1$ having approximately the same widths in the horizontal direction and the vertical direction of the vehicular lamp 1 by transmitting the projection lens 21, into light beams $L_2$ diffused to more greatly extend in the vertical direction than the horizontal direction such that the diffused light beams L2 are emitted to the outside of the vehicular lamp.

The turning ON/OFF of the plurality of LED chips 12 that configure the light source 10, the adjustment of an emission intensity of light from each LED chip 12, and the adjustment of the flashing speed are performed by the control unit 30. Therefore, the control unit 30 may individually turn ON/OFF the plurality of LED chips 12 or change the luminous intensity or the flashing speed of each LED chip 12. The control unit 30 is implemented by an element or a circuit such as a CPU or a storage unit of a computer as a hardware configuration, and implemented by a computer program or the like as a software configuration. Further, the control unit 30 is provided outside the lighting chamber 3 in FIG. 1, but may be provided inside the lighting chamber 3. The control unit 30 receives a signal from a lamp switch (not illustrated) or the like, and transmits various control signals to each LED chip 12 in accordance with the received signal.

Figure 4:
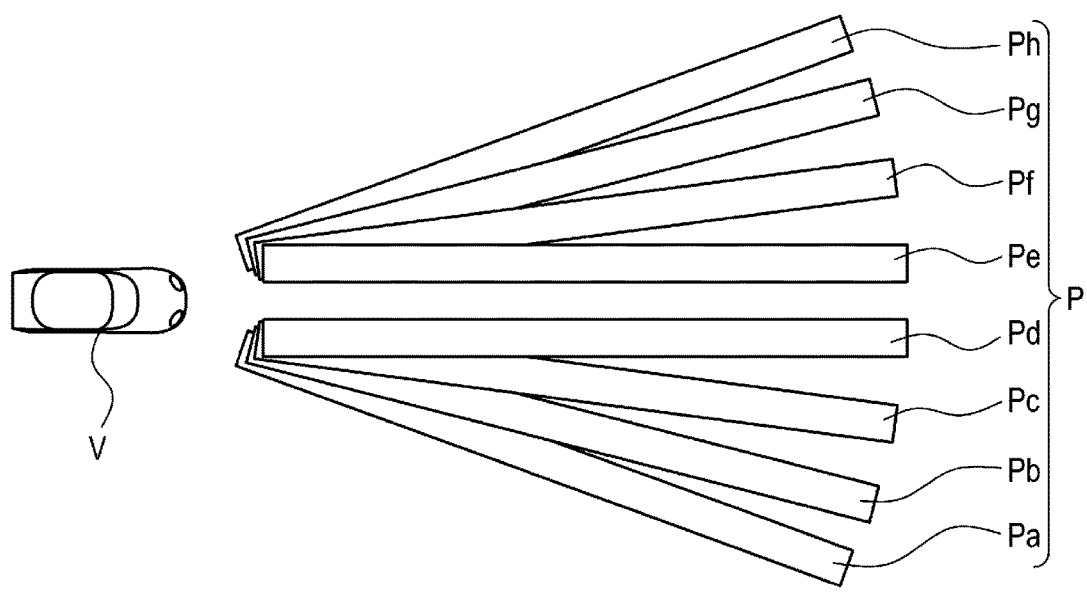
FIG. 4 is a view for explaining an exemplary light distribution pattern projected onto a road surface using a lamp according to the first exemplary embodiment.

FIG. 4 is a view for explaining an example of a light distribution pattern projected using a light source 10 and a projection lens group 20 according to a first exemplary embodiment. FIG. 4 is a light distribution pattern when all of the eight LED chips 12a to 12h arranged in a horizontal direction of the vehicular lamp are turned on.

As described above, light emitted from each LED chip 12 to transmit the projection lens 21 and thus turned into parallel lights having substantially the same widths in the horizontal direction and the vertical direction of the vehicle V transmits the additional lens 22 such that the light can be projected onto a road surface as a light distribution pattern P that extends in the vertical direction of the vehicle more than in the horizontal direction of the vehicle. Specifically, as illustrated in FIG. 4, each light source image formed by each of the LED chips 12a to 12h forms each light distribution pattern Pa to Ph. In each light distribution pattern Pa to Ph, for example, an aspect ratio of the width in the longitudinal direction with respect to the width in the horizontal direction is 5 or larger assuming that the width in the horizontal direction of the vehicle is 1. As an aspect ratio of each light distribution pattern Pa to Ph, the aspect ratio of the width in the longitudinal direction with respect to the width in the horizontal direction may be 1:10 or more. Therefore, for example, each light distribution pattern Pa to Ph may irradiate light in the range of 10 m to 100 m from the front side of the vehicle. When a vertically elongated light distribution pattern having a larger aspect ratio than that of the above-described example is necessary, it is also possible to cope with the necessity by increasing the aspect ratio of the light source image, in addition to a method of changing the magnification ratio of the light source image obtained by an optical system such as the projection lens 21. For example, as an aspect ratio of the light source image formed by light from each LED chip 12, the aspect ratio of the width in the vertical direction of the vehicle with respect to the width in the horizontal direction of the vehicle may be, for example, 1.5 to 5, assuming that the width in the horizontal direction of the vehicle is 1. As a method for changing the aspect ratio of the light source, the shape of the LED chips may be changed to implement the above-mentioned aspect ratio, or the aspect ratio may be implemented by arranging the plurality of LED chips in parallel to each other.

Figure 5:
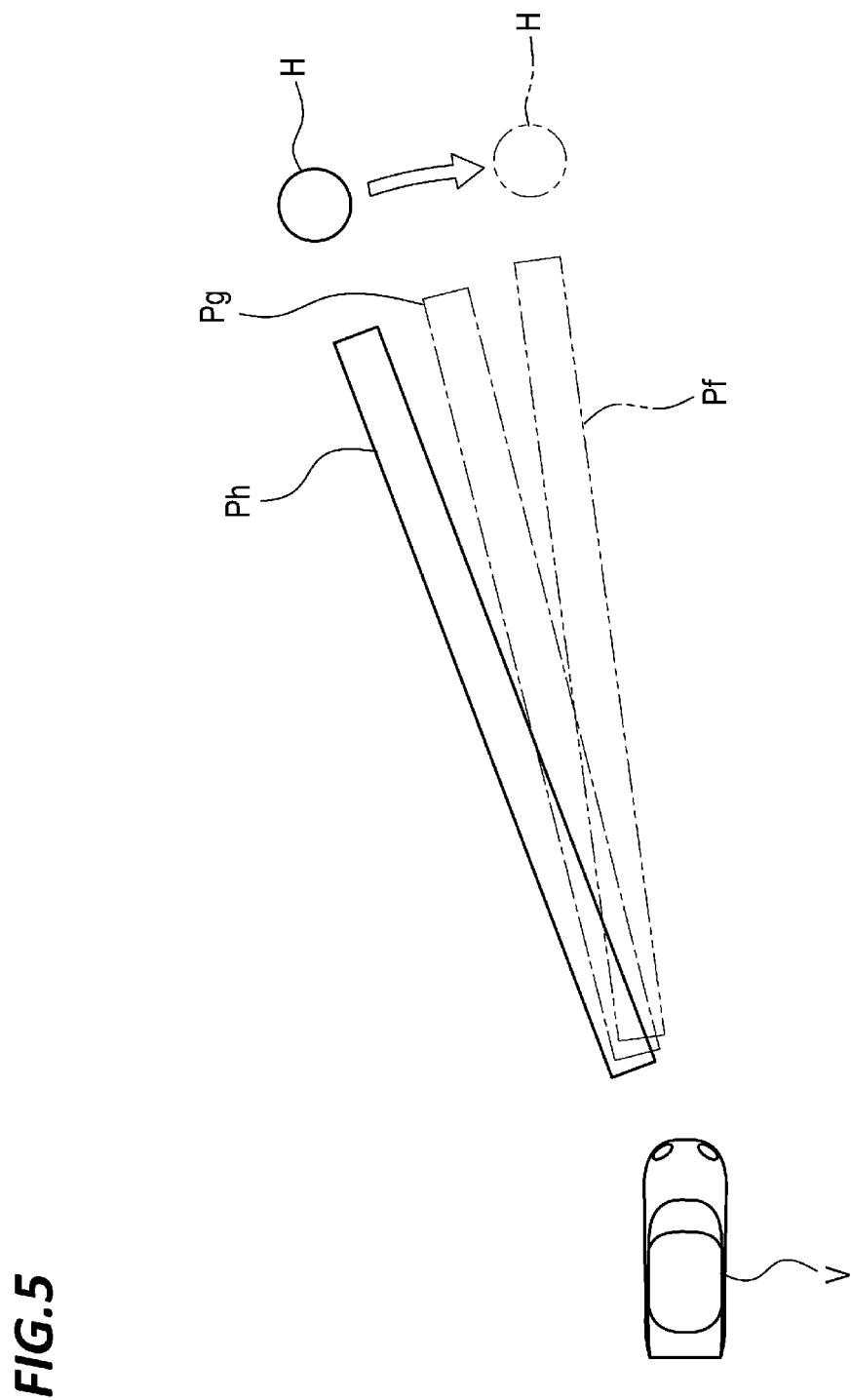
FIG. 5 is a view for explaining a control example of a light distribution pattern illustrated in FIG. 4.

FIG. 4 illustrates the light distribution patterns Pa to Ph when all of the eight Led chips 12a to 12h are turned on. However, in practice, at least one of the plurality of LED chips 12a to 12h may be turned on according to the position of an object (for example, a pedestrian H) other than the own vehicle V by a control signal from the ON/OFF control unit 30. FIG. 5 illustrates a case in which, as the pedestrian H moves from the left side to the right side in the front side of the vehicle, the LED chips 12h to 12f are sequentially turned ON/OFF so as to sequentially form the light distribution patterns Ph to Pf.

As described above, the present exemplary embodiment provides the plurality of road surface drawing LED chips 12 that is capable of being individually turned ON/OFF, and the projection lens 21 and the additional lens 22 that constitute the projection lens group 20 configured to transmit light emitted from the plurality of LED chips 12. Further, the plurality of LED chips 12 are arranged in parallel to each other along the horizontal direction of the vehicle V, and the projection lens 21 and the additional lens 22 are capable of projecting the light source image of each LED chip 12 onto the road surface as a light distribution pattern P that extends in the vertical direction more than in the horizontal direction of the vehicle. According to this configuration, for example, by detecting an object such as a pedestrian and irradiating a vertically elongated light distribution pattern P in a direction toward the detected object, it is possible to make a driver know the presence of the object, thereby improving the safety of driving. Further, it is possible to perform road surface drawing in an appropriate direction by changing the LED chips 12 to be turned on with respect to a change in the relative position of an object such as a pedestrian.

Since the luminous intensity or the flashing speed of each LED chip 12 varies by a control signal from the control unit 30, for example, it is possible to notify the driver or the pedestrian of the level of a degree of collision risk by changing the brightness or the flashing speed of the light distribution pattern P by changing the luminous intensity or the flashing speed of the LED chip 12 according to the degree of collision risk of the object to the vehicle.

Figure 6:
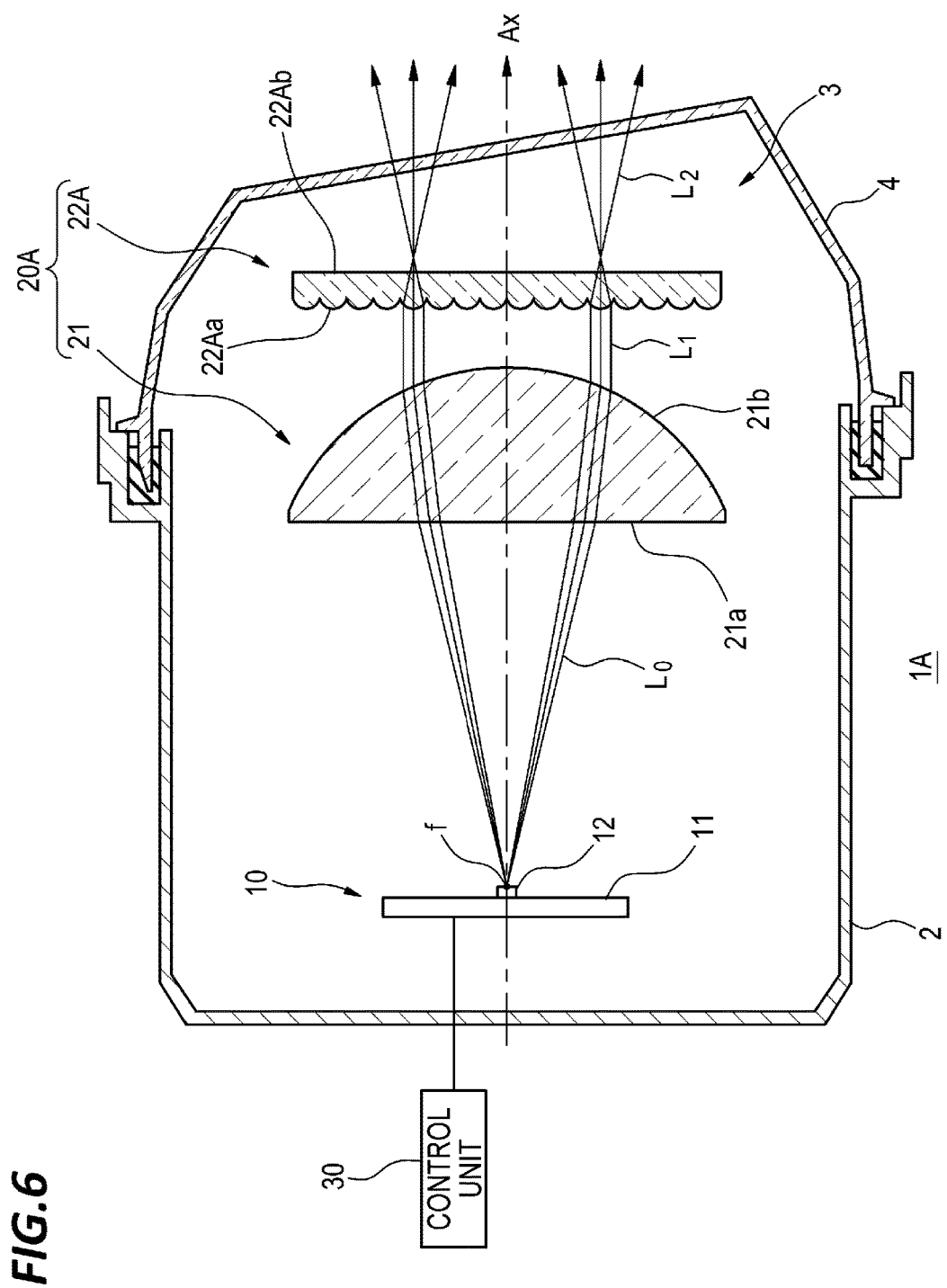
FIG. 6 is a vertical sectional view illustrating a schematic structure of a vehicular lamp according to a modification of the first exemplary embodiment.

In addition, in the above-described first exemplary embodiment, a plurality of cylindrical steps are formed on the light emission surface 22b of the additional lens 22 to be parallel to each other in the vertical direction. However, as the configuration of the vehicular lamp 1A illustrated in FIG. 6, a plurality of cylindrical steps may be formed on the light entrance surface 22Aa of the additional lens 22A to be parallel to each other in the vertical direction. According to this configuration, as in the first exemplary embodiment, the light incident on the additional lens 22A may be diffused in the vertical direction more than in the horizontal direction by the cylindrical steps formed on the light entrance surface 22Aa of the additional lens 22A such that the light distribution pattern P elongated in the longitudinal direction more than in the horizontal direction may be formed. Further, the steps formed on the additional lenses 22 and 22A may be steps having a shape continued in tangent (or a concave and convex shape having a tangent continuity) or steps having a shape continued in curvature (a concave and convex shape having a curvature continuity) without being limited to the cylindrical steps. Further, the steps may have a triangular shape without being limited to a curved surface.

Second Exemplary Embodiment

Figure 7:
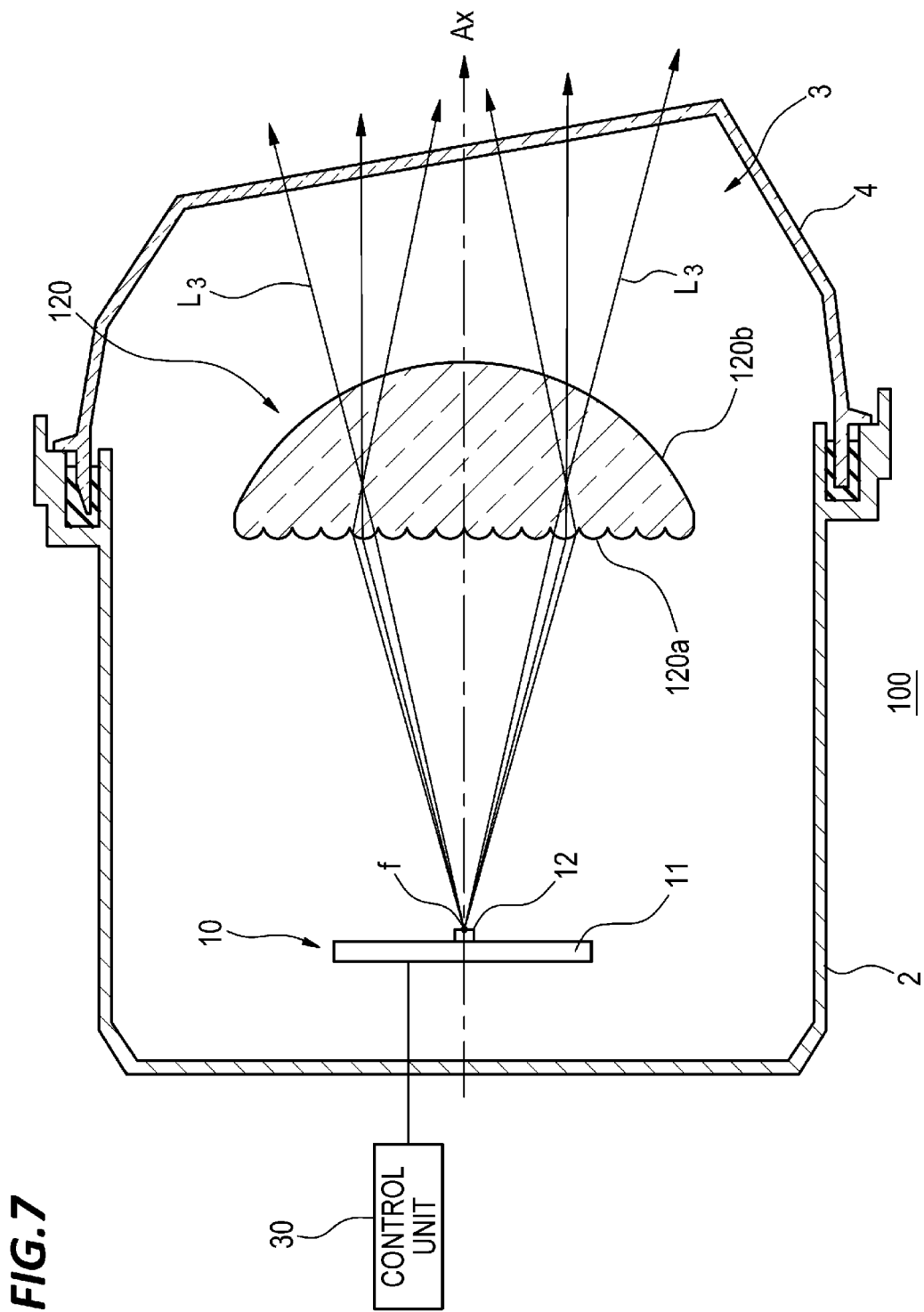
FIG. 7 is a vertical sectional view illustrating a schematic configuration of a vehicular lamp according to a second exemplary embodiment of the present disclosure.

FIG. 7 is a vertical sectional view of a vehicular lamp according to a second exemplary embodiment.

The vehicular lamp 100 according to the second exemplary embodiment includes a projection lens 120, instead of the projection lens group 20 of the first exemplary embodiment. The projection lens 120 has a light entrance surface 120a that faces a plurality of LED chips 12 and a convex light emission surface 120b that faces the front side of the vehicular lamp. Meanwhile, in the vertical sectional view illustrated in FIG. 7, a plurality of cylindrical steps arranged in parallel in the vertical direction of the vehicular lamp are formed on the light entrance surface 120a of the projection lens 120.

In the vehicular lamp 100 with the above-described configuration, the light emitted from each LED chip 12 is incident on the light entrance surface 120a of the projection lens 120, and emitted from the light emission surface 120b. The light emitted from the light emission surface 120a to the outside is turned into a light beam that is parallel to the optical axis Ax on a plane parallel to a horizontal plane including the optical axis Ax (see, e.g., FIG. 2). In the meantime, as illustrated in FIG. 7, in the plane parallel to the vertical plane including the optical axis Ax, light emitted from the light emission surface 120b to the outside is turned into light beams L3 which are vertically diffused with respect to the optical axis Ax by the cylindrical steps formed in parallel in the vertical direction on the light entrance surface 120a. As described above, according to the present exemplary embodiment, the light which has transmitted the projection lens 120 is emitted to the outside of the vehicular lamp as light that is diffused in the vertical direction more than in the horizontal direction.

Figure 8:
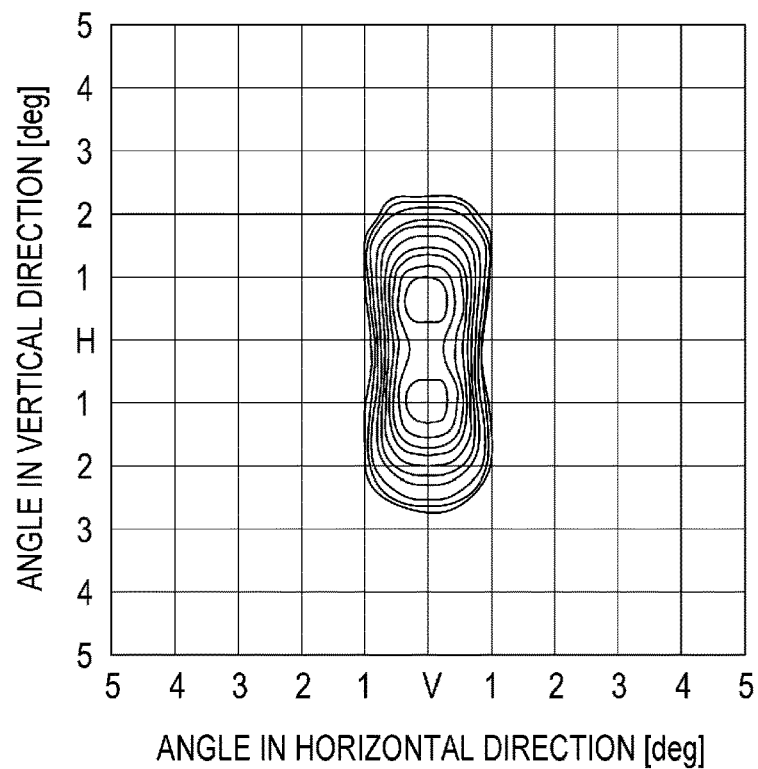
FIG. 8 is a view illustrating an illuminance distribution, on a virtual screen, of a light distribution pattern formed by a vehicular lamp according to a second exemplary embodiment of the present disclosure.

FIG. 8 is a view illustrating an illuminance distribution, on a virtual screen, of a light distribution pattern formed by a vehicular lamp 100 according to a second exemplary embodiment of the present disclosure.

As illustrated in FIG. 8, the light distribution pattern formed by the vehicular lamp 100 has two peaks of the luminous intensity in the upper and lower portions of the light distribution pattern. Accordingly, the light distribution in which brightness of light irradiated near the vehicle and brightness of light irradiated distant from the vehicle are compatible with each other may be achieved. Therefore, it is possible to obtain a light distribution pattern that provides good visibility to either the driver or the pedestrian.

Figure 9:
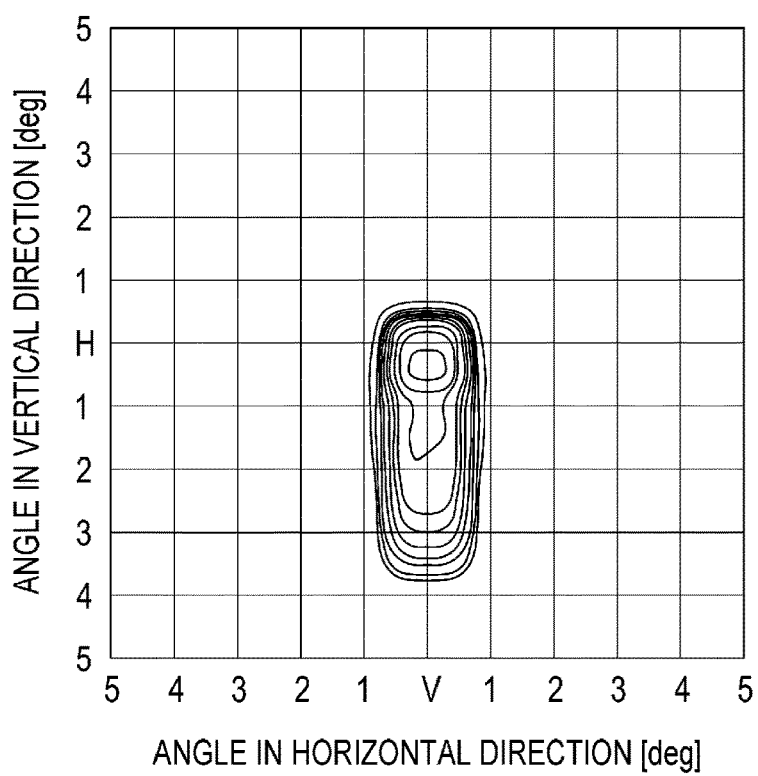
FIG. 9 is a view illustrating an illuminance distribution, on a virtual screen, of a light distribution pattern formed by a vehicular lamp according to a modification of the second exemplary embodiment of the present disclosure.

FIG. 9 is a view illustrating an illuminance distribution, on a virtual screen, of a light distribution pattern formed by a vehicular lamp according to a modification of a second exemplary embodiment of the present disclosure.

The light distribution pattern illustrated in FIG. 9 is an illuminance distribution of the light distribution pattern when the projection lens is formed by a free curved surface (so-called a free curved surface lens). The free curved surface lens is designed such that light emitted from each LED chip 12 is only diffused to the lower side of the vehicular lamp. As illustrated in FIG. 9, the light distribution pattern formed by the free curved surface lens has one peak of luminous intensity in the upper portion of the light distribution pattern. Therefore, it is possible to provide a bright distribution to a far distance from the vehicle so that it is possible to obtain a light distribution pattern that provides good visibility to either the driver or the pedestrian.

Figure 10:
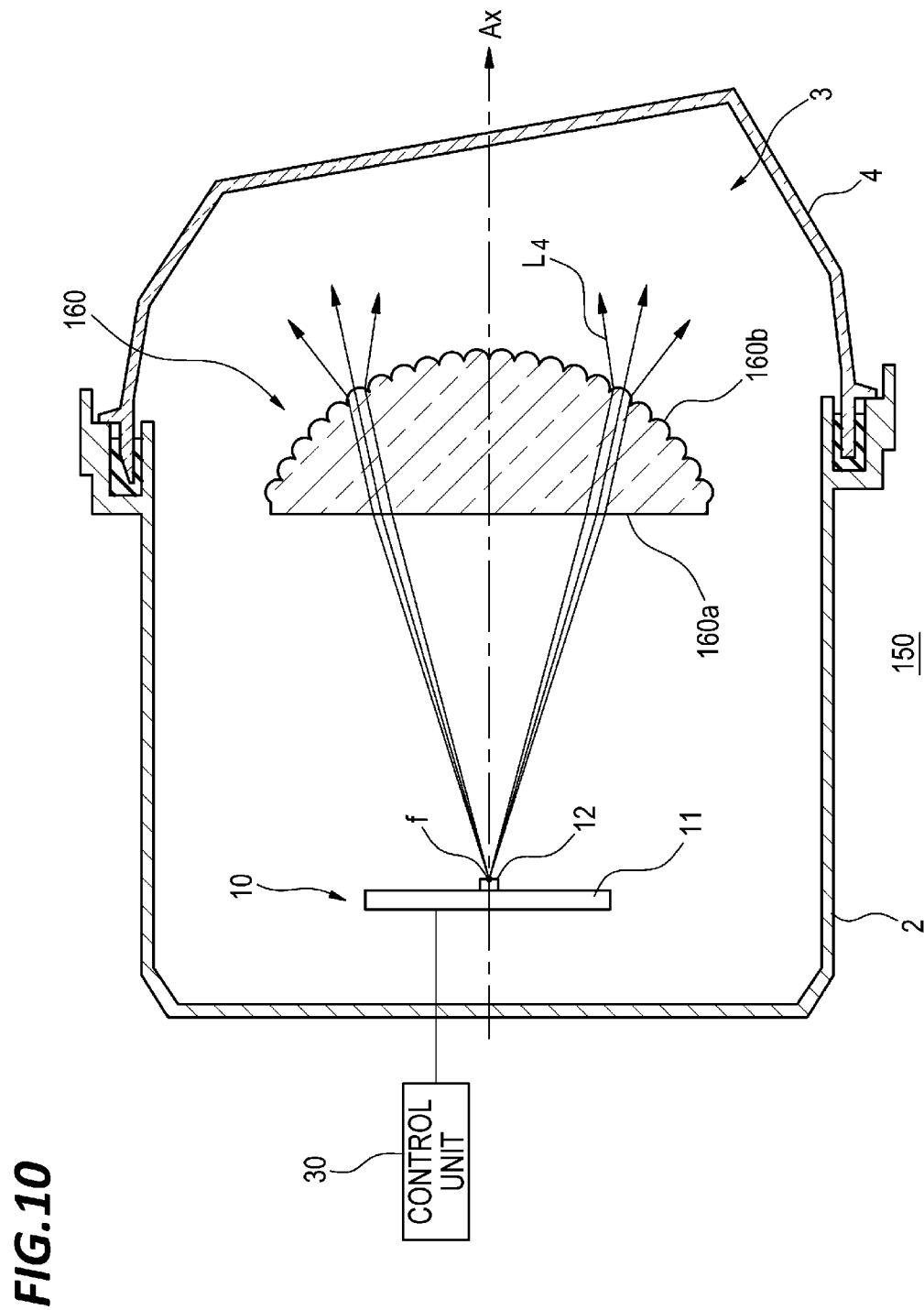
FIG. 10 is a vertical sectional view illustrating a schematic configuration of a vehicular lamp according to another modification of the second exemplary embodiment of the present disclosure.

FIG. 10 is a vertical sectional view of a vehicular lamp according to a modification of a second exemplary embodiment.

A vehicular lamp 150 according to the modification includes a projection lens 160 instead of the projection lens 120 according to the second exemplary embodiment. The projection lens 160 has a planar type light entrance surface 160a that faces a plurality of LED chips 12 and a substantially convex light emission surface 160b that faces the front side of the vehicular lamp. In the vertical sectional view illustrated in FIG. 10, a plurality of cylindrical steps arranged in parallel in the vertical direction of the vehicular lamp are formed on the light emission surface 160b of the projection lens 160.

In the vehicular lamp 150 with the above-described configuration, the light emitted from each LED chip 12 is incident on the light entrance surface 160a of the projection lens 160 and emitted from the light emission surface 160b. The light emitted from the light emission surface 160b to the outside is turn into light beams that are parallel to the optical axis Ax on a plane parallel to a horizontal plane including the optical axis Ax (see FIG. 2). In the meantime, as illustrated in FIG. 10, in the plane parallel to the vertical plane including the optical axis Ax, the light emitted from the light emission surface 160b to the outside is turned into light beams $L_4$ that are vertically diffused with respect to the optical axis Ax by the cylindrical steps formed on the light emission surface 160b. As described above, according to the present modification, the light which has transmitted the projection lens 160 is emitted to the outside of the vehicular lamp as light that is diffused in the vertical direction more than in the horizontal direction.

As described above, according to the configuration of the second exemplary embodiment and the modification, the plurality of cylindrical steps are formed on the light entrance surface 120a of the projection lens 120 or the light emission surface 160b of the projection lens 160. Thus, it is possible to obtain the light distribution pattern P (see, e.g., FIG. 4) that is elongated in the longitudinal direction more than in the horizontal direction with a simple configuration.

Further, the cylindrical steps may be formed on both the light entrance surface and the light emission surface of the projection lens. Furthermore, the cylindrical steps may be formed in at least a portion of the light entrance surface and the light emission surface, for example, only in a region which the light from each LED chip 12 transmits. Further, the steps formed on the projection lens 120 may be steps having a shape continued in tangent (or a concave and convex shape having a tangent continuity) or steps having a shape continued in curvature (a concave and convex shape having a curvature continuity) without being limited to the cylindrical steps. Further, the steps may have a triangular shape without being limited to a curved surface.

Third Exemplary Embodiment

Figure 11:
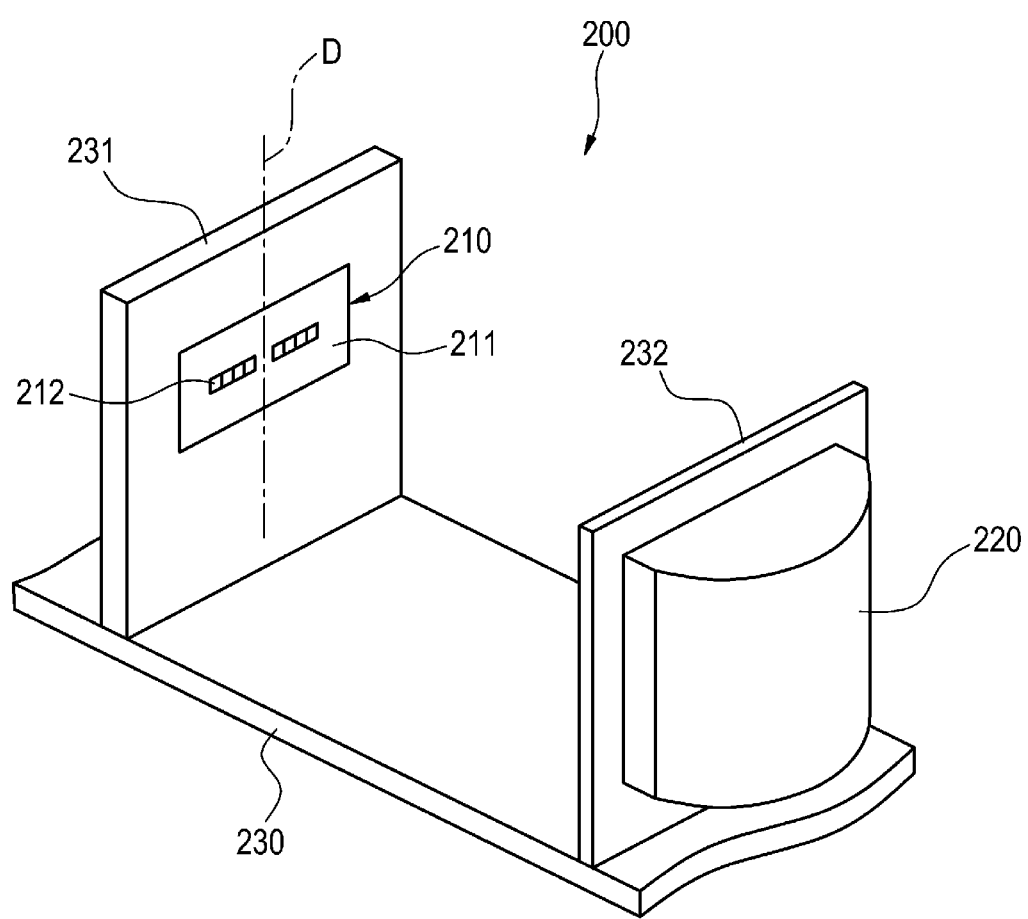
FIG. 11 is a perspective view illustrating schematic configurations of a light source and a projection lens of a vehicular lamp according to a third exemplary embodiment of the present disclosure.

FIG. 11 is a perspective view of a vehicular lamp according to a third exemplary embodiment. Further, in FIG. 11, the lamp body 2, the translucent cover 4, and the control unit 30 illustrated in FIG. 1 are omitted.

A vehicular lamp 200 of the third exemplary embodiment includes a light source 210 and a cylindrical lens 220. The light source 210 includes a board 211 and a plurality of (eight in the present exemplary embodiment) light emitting elements 212 formed on the board 211 and arranged in parallel in the horizontal direction. The board 211 of the light source 210 is held by a plate-shaped holding member 231. The cylindrical lens 220 is, for example, a cylindrical plane-convex lens as illustrated in FIG. 11, and is disposed such that a focal line direction D is orthogonal to, that is, perpendicular to the parallel direction of the plurality of light emitting elements 212. The cylindrical lens 220 is configured as a lens that has a curvature of a convex lens in the horizontal direction (see, e.g., FIG. 12A) and does not have a curvature (see, e.g., FIG. 12B) in the vertical direction. Therefore, only the horizontal direction of the cylindrical lens serves as a plane-convex lens, and light is refracted in a converged direction. The cylindrical lens 220 is held by a plate-shaped holding member 232. The holding member 231 that holds the board 211 and the holding member 232 that holds the cylindrical lens 220 are fixedly erected on a base 230 such that the plurality of light emitting elements 212 are disposed near the rear focus of the cylindrical lens 220.

Figure 12A:
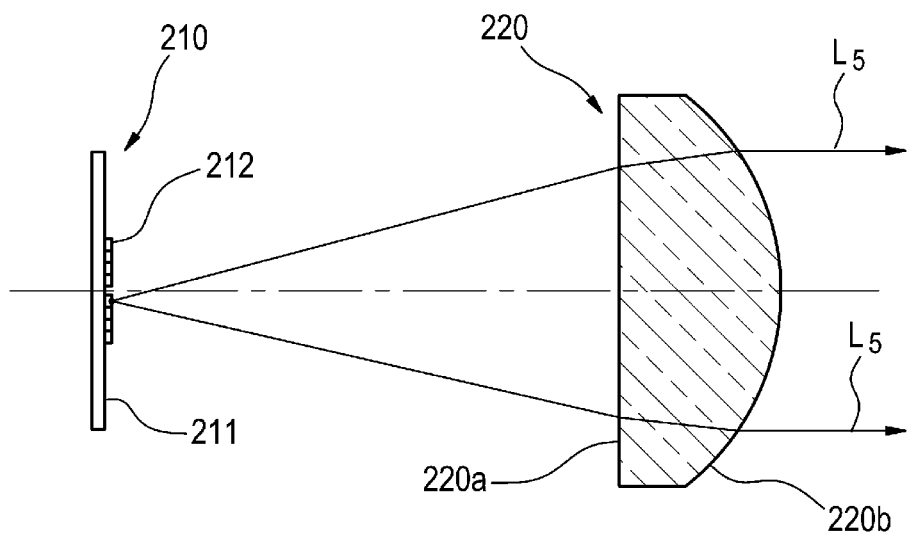
FIG. 12A is a view illustrating light beams, which are emitted from a light source according to the third exemplary embodiment to pass through a projection lens, in a plane that is parallel to a horizontal plane
Figure 12B:
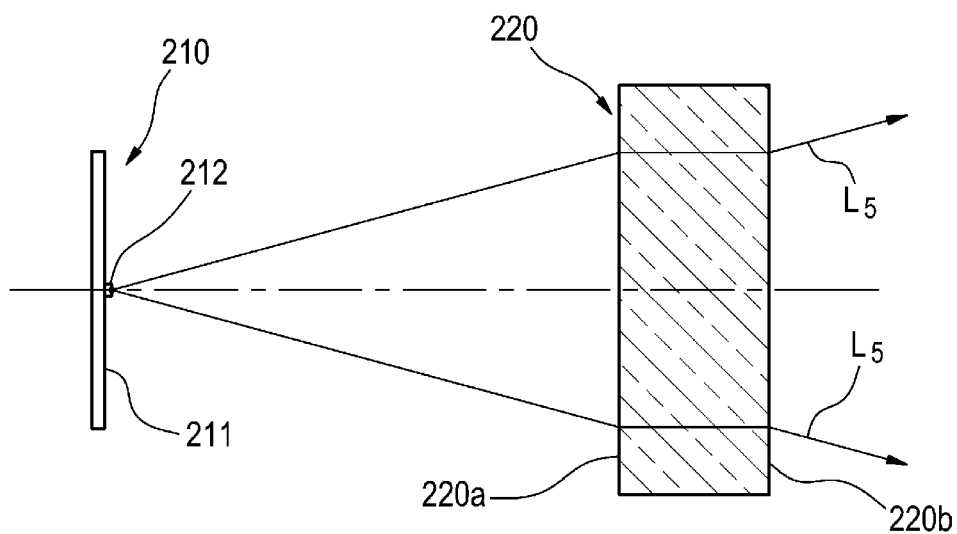
FIG. 12B is a view illustrating light beams, which are emitted from the light source according to the third exemplary embodiment to pass through the projection lens, in a plane that is parallel to a vertical plane.

In the vehicular lamp 200 with the above-described configuration, as illustrated in FIG. 12A, light beams $L_5$ emitted from each LED chip 12 to be incident on the light entrance surface 220a of the cylindrical lens 220 are emitted from the light emission surface 220b to the outside as light beams (approximately parallel light beams) that are refracted toward a light converging direction in a plane parallel to a horizontal plane that is orthogonal to the focal line direction D. On the contrary, as illustrated in FIG. 12B, in a plane parallel to the vertical plane according to the focal line direction D, the light entrance surface 220a and the light emission surface 220b of the cylindrical lens 220 do not have a curvature, so that light beams $L_5$ emitted from each LED chip 12 are refracted to a direction where the light beams are converged to an optical axis on the light entrance surface 220a of the cylindrical lens 220, and refracted to a direction where the light beams are diffused to be substantially parallel to the light beams emitted from each LED chip 12 on the light emission surface 220b of the cylindrical lens 220. That is, in the plane parallel to the vertical plane according to the focal line direction D, the light is emitted to the outside as light beams which substantially maintain the emission angle of light beams $L_5$ from the LED chip 12. As described above, according to the exemplary embodiment, the light beams $L_5$ which have transmitted the cylindrical lens 220 are diffused in the vertical direction more than in the horizontal direction so the light distribution pattern P as illustrated in FIG. 4 may be obtained.

As described above, according to the configuration of the third exemplary embodiment, the cylindrical lens 220 is disposed such that the focal line direction D of the cylindrical lens 220 is orthogonal to a parallel direction of the plurality of light emitting elements 212 such that a vertically elongated light distribution pattern may be obtained by a simple configuration.

Figure 13:
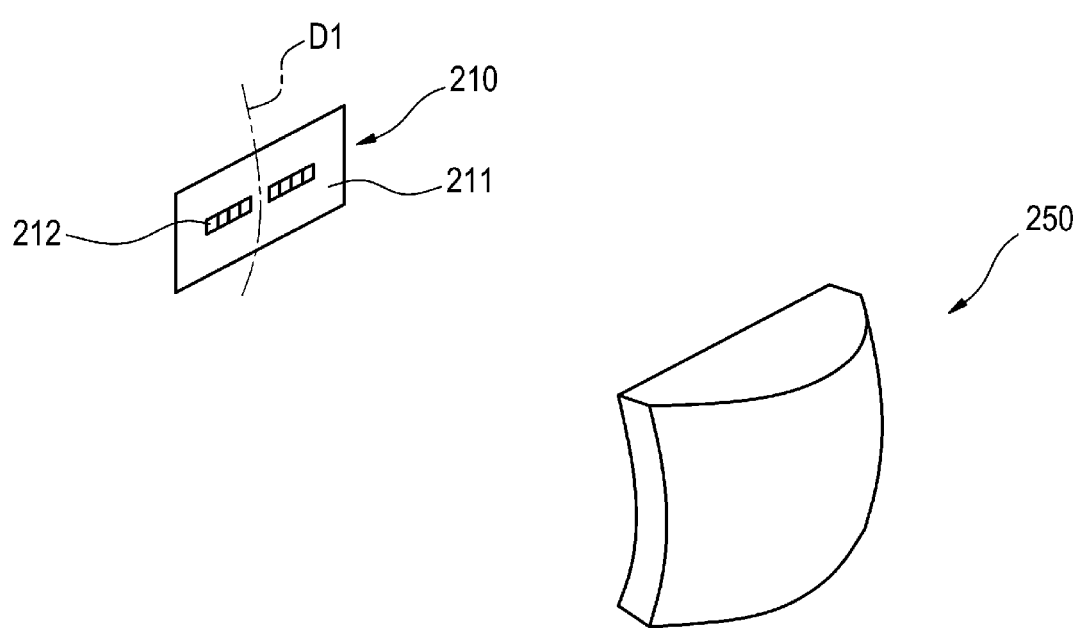
FIG. 13 is a perspective view of a projection lens according to a modification of a third exemplary embodiment.

The cylindrical lens may be configured with a toric lens 260 illustrated in FIG. 13. The toric lens 260 is a lens having a refracting surface (light entrance surface) that is vertically curved such that a focal line direction D1 of the lens has a convex shape. The cylindrical lens has a function of condensing or diverging only one direction component of light but the toric lens may arbitrarily condense or diverge other direction components of light. When the cylindrical lens linearly condenses the light from the light emitting element, the length of an optical path from the light emitting element to the light entrance surface of the lens at the center of the cylindrical lens is different from that at an end of the cylindrical lens, so that a deviation in focal position may occur. On the contrary, as described in the modification, in the toric lens 260, the position of the refracting surface varies depending on the length of the optical path from the light emitting element to the light entrance surface of the lens so that focusing may be performed even at the end of the light distribution pattern P. Accordingly, uniform brightness can be achieved even at the opposite ends of the vertically elongated light distribution pattern P which is drawn on the road surface.

Examples of the exemplary embodiment of the present disclosure have been described above, but the present disclosure is not limited to the above-described exemplary embodiment and may employ another configuration if necessary.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
a plurality of light emitting elements for road surface drawing which are individually turned ON/OFF; and
an optical system configured to transmit light emitted from the plurality of light emitting elements,
wherein the plurality of light emitting elements are arranged in parallel along a horizontal direction of a vehicle,
the optical system projects a light source image of each of the light emitting elements on a road surface as a light distribution pattern that extends in a vertical direction of the vehicle more than in a horizontal direction of the vehicle, and
in the light source image of each light emitting element, an aspect ratio of a width in the vertical direction with respect to a width in the horizontal direction is 0.5 or more and 1.5 or less, and in the light distribution pattern projected on the road surface, an aspect ratio of a width in a longitudinal direction of the vehicle with respect to a width in a horizontal direction is 5 or more.

2. The vehicular lamp of claim 1, wherein the optical system includes a projection lens and an additional lens,
the projection lens is configured with a lens that turns light from the plurality of light emitting elements into parallel light beams in which a width in the horizontal direction and a width in the vertical direction is substantially equal to each other, and
the additional lens is configured with a lens that diffuses light in the vertical direction more than in the horizontal direction.

3. The vehicular lamp of claim 2, wherein the additional lens is disposed opposite to the plurality of light emitting elements with the projection lens being interposed therebetween, and a plurality of steps, which diffuse light in the vertical direction more than in the horizontal direction, are formed on at least one of an light entrance surface and a light emission surface of the additional lens.

4. The vehicular lamp of claim 3, wherein the additional lens is a lenticular lens including cylindrical steps, which are formed to be arranged in parallel along the vertical direction of the vehicular lens as the plurality of steps.

5. The vehicular lamp of claim 2, wherein the additional lens is a lenticular lens including cylindrical steps, which are formed to be arranged in parallel along the vertical direction of the vehicular lens as the plurality of steps.

6. The vehicular lamp of claim 1, wherein the optical system is configured with a projection lens, and
a plurality of steps, which diffuse light from the plurality of light emitting elements in the vertical direction more than in the horizontal direction, are formed on a light entrance surface of the projection lens.

7. The vehicular lamp of claim 6, wherein the optical system is configured with a projection lens, and
a plurality of steps, which diffuse light from the plurality of light emitting elements in the vertical direction more than in the horizontal direction, are formed on a light emission surface of the projection lens.

8. The vehicular lamp of claim 1, wherein the optical system is configured with a projection lens, and
a plurality of steps, which diffuse light from the plurality of light emitting elements in the vertical direction more than in the horizontal direction, are formed on a light emission surface of the projection lens.

9. The vehicular lamp of claim 1, wherein the optical system is configured with a cylindrical lens, and
the cylindrical lens is disposed such that a focal line direction of the cylindrical lens is aligned with a direction orthogonal to the parallel direction of the plurality of light emitting elements.

10. The vehicular lamp of claim 9, wherein the cylindrical lens is configured with a toric lens.

11. A control system of a vehicular lamp, comprising:
the vehicular lamp according to claim 1; and
an ON/OFF control unit configured to control turning-ON/OFF of the plurality of light emitting elements,
wherein the ON/OFF control unit turns on at least one of the plurality of light emitting elements according to a position of an object other than the vehicle.

12. The control system of claim 11, wherein the ON/OFF control unit changes a luminous intensity or a flashing speed of the plurality of light emitting elements.

13. A vehicle comprising:
the control system of a vehicular lamp according to claim 11.

* * * * *